United States Patent [19]

Livingston

[11] 4,066,179

[45] Jan. 3, 1978

[54] APPARATUS FOR COLLECTING OBJECTS FROM A SURFACE

[76] Inventor: Almer K. Livingston, Church St., Smithville, Ga. 31787

[21] Appl. No.: 717,912

[22] Filed: Aug. 26, 1976

Related U.S. Application Data

[63] Continuation-in-part of Ser. No. 680,869, April 27, 1976.

[51] Int. Cl.$^2$ .............................................. B60P 1/00
[52] U.S. Cl. ................................. 214/356; 56/328 R
[58] Field of Search ..................... 214/356; 56/328 R

[56] References Cited

U.S. PATENT DOCUMENTS

| | | | |
|---|---|---|---|
| 1,859,980 | 5/1932 | Mueller | 56/328 R |
| 2,539,596 | 1/1951 | Smith | 214/356 X |
| 2,599,715 | 6/1952 | Lepper | 56/328 R |
| 3,807,154 | 4/1974 | Moore | 214/356 X |
| 3,888,370 | 6/1975 | Gamblin | 214/356 |
| 3,995,759 | 12/1976 | Hollrock et al. | 214/356 |

FOREIGN PATENT DOCUMENTS 397,154  2/1974  U.S.S.R. .......................... 56/328 R

*Primary Examiner*—Albert J. Makay
*Attorney, Agent, or Firm*—Finnegan, Henderson, Farabow & Garrett

[57] ABSTRACT

An apparatus for collecting objects from a surface by grasping the objects between a plurality of discs having resiliently deformable segments. Rotation of the discs with the objects therebetween transports the objects from the surface to a separate portion of the device where they are extracted by arcuate members between the discs and collected. In another form, a plurality of axially spaced wheels each including a multiplicity of circumferentially spaced elongated elastically deformable members having diametrically enlarged balls at their tips rotates along the surface. Objects are received between the balls and retained by the members at locations radially inwardly of the balls. Extractors projecting between the wheels remove the objects and guide them to a collection container.

12 Claims, 11 Drawing Figures

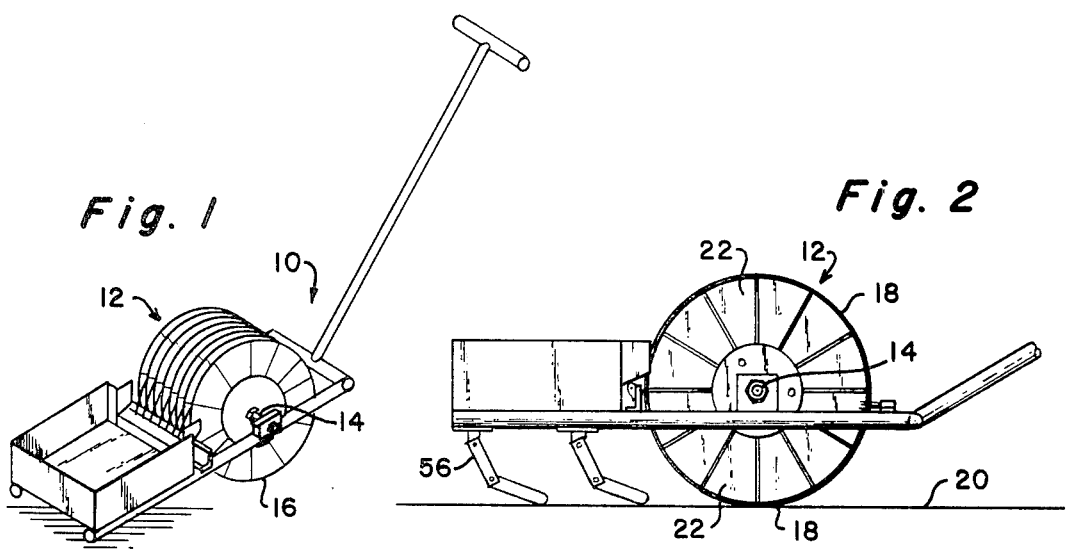
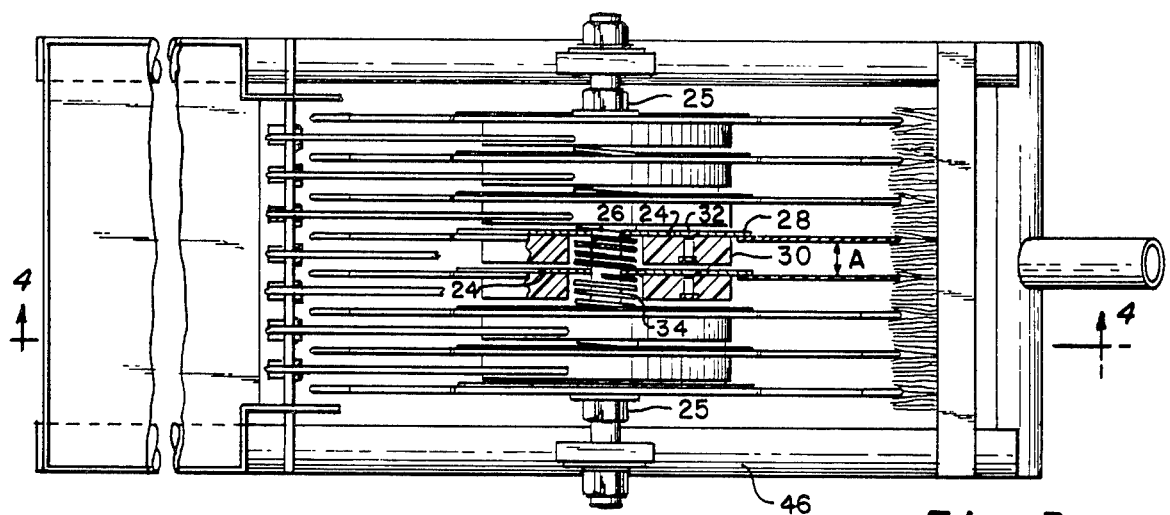
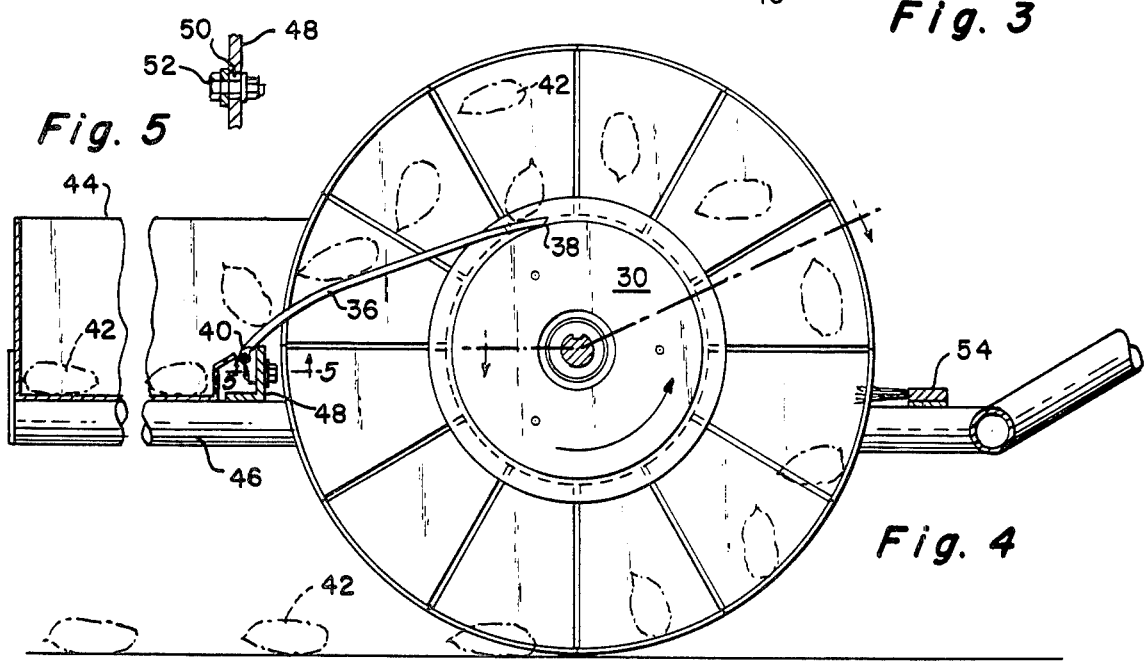

APPARATUS FOR COLLECTING OBJECTS FROM A SURFACE

BACKGROUND OF INVENTION

This application is a continuation-in-part of my prior application Ser. No. 680,869 filed Apr. 27, 1976 of like title.

The present invention relates to an apparatus for the collection of objects from a surface.

The collection of objects dispersed about a surface, as for example, nuts or golf balls, is a time-consuming, difficult task to accomplish manually. Consequently, there have been proposed numerous devices for the mechanical collection of objects from a surface. The majority of these devices are complex and cumbersome.

U.S. Pat. No. 2,482,355 to McBride, for example, discloses a collecting device to be attached to the front of a vehicle. The device consists of a pair of cage-like cylindrical components having parallel but axially displaced axes of rotation. The mismatch in the axes of rotation causes one of the cage-like members to disengage objects in the grasp of the other member engaging the objects to be collected. The configuration of the cage-like members of this device, in addition to being complex, results in the device being prone to clogging and the collection of undesirable products from the surface over which the device is passed.

U.S. Pat. Nos. 3,744,255 and 3,613,341 to Reeves, both disclose nut-harvesting machines with a plurality of driven discs. The discs define chambers in which the nuts are retained once placed within the discs.

These references and the prior art in general disclose devices for collecting objects from surfaces that are unduly cumbersome and complex. The complexity of such devices not only makes such devices expensive to manufacture and maintain, but increases the weight of such devices to a degree that when nuts are collected, the device may crush nuts that do not correctly engage with the grasping portion of the device.

Furthermore, where objects of various sizes are to be collected, the presence of a larger object between adjacent discs may force the discs apart to a degree that smaller objects near the larger ones are not retained. By providing a disc with a plurality of segments, this disadvantage of prior art devices is alleviated.

A further advantage of the present invention is the ease of adjustment of the spacing between the adjacent discs. This allows the device to be readily altered to collect different types and shapes of objects or to be adjusted to a spacing that most efficiently engages the objects to be collected.

Further advantages of the present invention will be apparent from the description of the preferred embodiment, or may be learned by practice of the invention.

SUMMARY OF THE INVENTION

In accordance with the purposes of the invention as embodied and broadly described herein, the apparatus of the present invention collects a plurality of objects from a surface by grasping the objects between axially deformable discs and transporting them to a portion of the apparatus where they are collected.

The portion of the device that grasps the objects includes a central shaft substantially parallel to the surface with a plurality of radially disposed discs mounted on the shaft. The peripheral edges of the discs are in contact with the surface from which the objects are to be collected with the discs being separated along the shaft a distance less than the smallest cross-sectional dimension of the objects to be collected. Each of the discs is comprised of a plurality of radially disposed segments deformable in a direction parallel to the shaft to grasp the object between the segments. While the objects are grasped between the segments, they are transported to a different location on the apparatus when the discs are rotated.

The apparatus further includes members between the discs for extracting the objects therefrom during the rotation of the discs. The objects, once extracted, are collected on a separate portion of the apparatus.

Preferably, each of the radially disposed discs is comprised of a central hub mounted on the shaft with mounting on the shaft allowing movement of the hub along the length of the shaft. Resilient members between the discs separate adjacent discs one from the other. The radially disposed segments of the discs are affixed to the outer peripheral edge of the hub with spacers mounted to the hub of a thickness sufficient to substantially fill the space between adjacent discs.

It is also preferred that the individual members between the discs for extracting the objects therefrom each comprise an arcuate member with one extremity of the member adjacent the spacer. The opposite extremity of the arcuate member is affixed to the apparatus outside the peripheral edge of the discs. The arcuate member presents a convex surface to objects between the segments that contact the arcuate member due to the rotation of the discs.

It is also preferred that the apparatus include members affixed to the apparatus preceding the discs for aligning the objects on the surface prior to their contacting the discs. The aligning members orient the objects so the smallest cross-sectional dimension of the objects is parallel to the shaft.

In another embodiment of the present invention, the apparatus includes a plurality of axially spaced wheels. Each wheel comprises a plurality of elongated elastically deformable members carried by a frame for rotation about an axis parallel to the surface. Each member includes a helical spring which has its long axis substantially coaxial with the radial extent of the member. Each member terminates in an enlarged ball which, with the balls of adjacent members, form an opening smaller than the opening defined between portions of such members radially inwardly of such balls.

In the latter embodiment, rotation of the wheels locates objects between the balls on the surface, the objects forcing flexion of the members to enable the objects to pass upwardly into the wheels between the portions of the members radially inwardly of the balls. When so disposed, the elasticity of the members together with the enlarged balls at their distal ends enable the members to retain the objects within the wheel for transport to an extractor and for ultimate delivery to a container.

BRIEF DESCRIPTION OF THE DRAWINGS

The accompanying drawings, which are incorporated in and constitute a part of the specification, illustrate several embodiments of the invention and, together with the description, serve to explain the principles of the invention.

IN THE DRAWINGS

Figure 6:
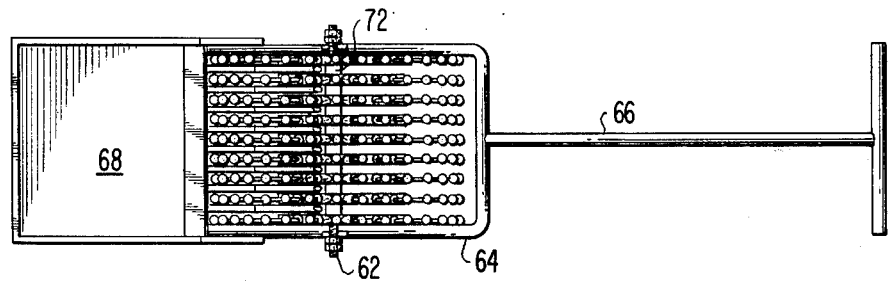
Figure 7:
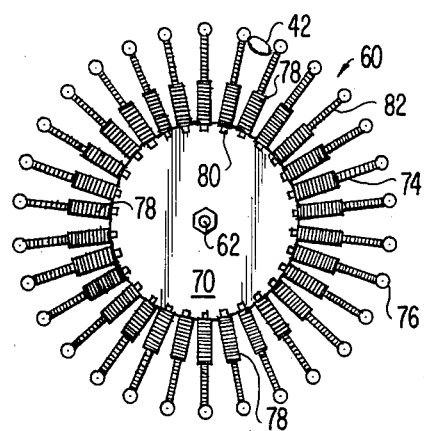
Figure 8:
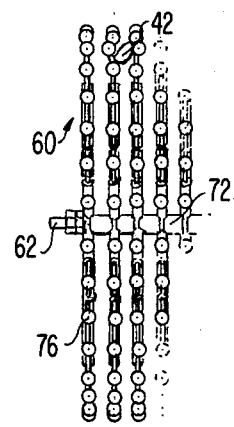
Figure 9:
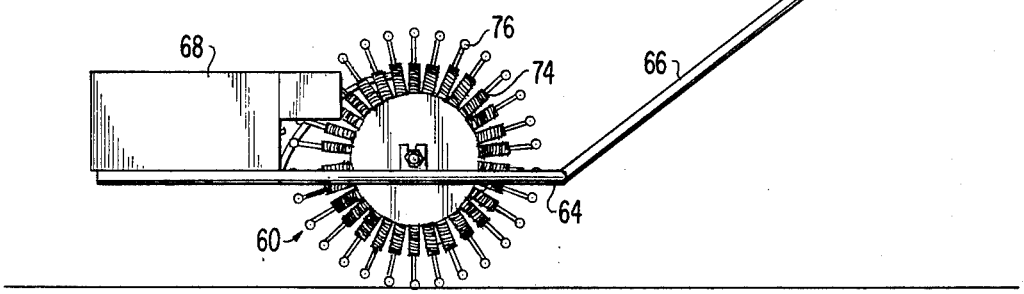
Figure 10:
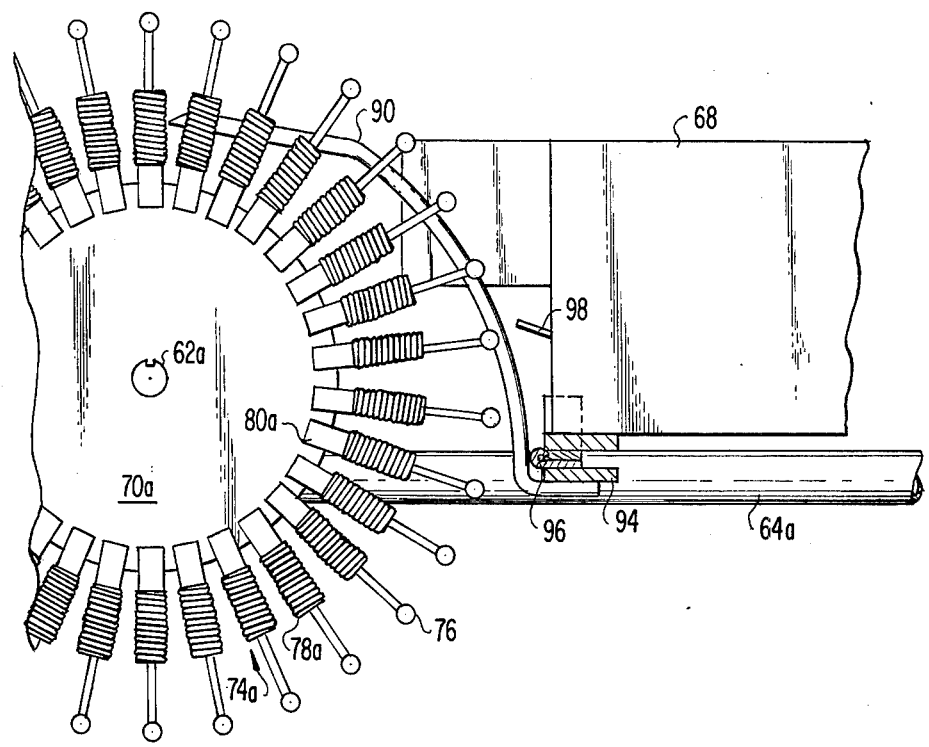
Figure 11:
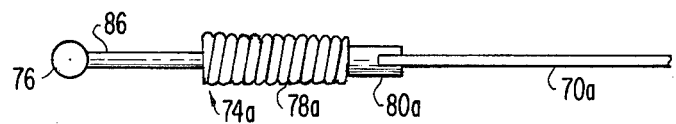

FIG. 1 is a perspective view of the apparatus for collecting objects from a surface in accordance with the invention;

FIG. 2 is a side view of the apparatus of FIG. 1 with the optional aligning members disposed beneath the container;

FIG. 3 is an enlarged top view of the present invention illustrating the preferred structure of discs and their attachment to the shaft;

FIG. 4 is a cross-section of the embodiment of FIG. 3 illustrating the grasping of objects between discs;

FIG. 5 is a detailed view of the point of attachment of the arcuate extracting members to the apparatus;

FIG. 6 is a top plan view of another embodiment of the present invention;

FIG. 7 is an enlarged fragmentary front elevational view of the wheels utilized in the embodiment hereof illustated in FIG. 6;

FIG. 8 is an enlarged elevational view of a wheel looking in a direction parallel to its axis;

FIG. 9 is a side elevational view of the apparatus illustrated in FIG. 6;

FIG. 10 is an enlarged fragmentary side elevational view illustrating a further form of wheel for the apparatus illustrated in FIG. 6; and FIG. 11 is an enlarged fragmentary view of an individual member carried by the wheel illustrated in FIG. 10.

DESCRIPTION OF THE PREFERRED EMBODIMENT

Reference will now be made in detail to the present preferred embodiment of the invention, an example of which is illustrated in the accompanying drawing FIGS. 1-5.

Referring now to FIGS. 1 and 2, it may be seen that the present invention is an apparatus useful for collecting objects from a surface. While the present invention has demonstrated utility for collecting nuts, the objects collected by the apparatus are determined primarily by the spacing of the discs comprising the grasping means and the force applied by the discs to the objects. Objects other than nuts may also be collected by the apparatus of the present invention.

In accordance with the invention, there is provided a plurality of segmented axially resilient discs for grasping objects from a surface. As here embodied and depicted in the Figures, the apparatus 10 includes grasping means 12 having a central shaft 14 substantially parallel to the surface. The central shaft supports a plurality of radially disposed discs 16 on the shaft with the peripheral edge 18 of the discs in contact with the surface 20. As depicted in FIG. 3, the discs 16 are separated along the shaft 14 a distance, indicated as A, which is less than the smallest cross-sectional dimension of objects to be collected. The objects, when placed between the discs, force the discs to separate with the force of the discs grasping the objects between the discs as shown in FIG. 4.

The discs 16 are comprised of a plurality of radially disposed segments 22. The segments 22 and, hence, the discs 16 are deformable in a direction parallel the shaft 14 to grasp the objects between the segments. Rotation of the discs 16 transports the objects grasped within the segments as the discs are rotated. The movement of objects grasped between the segments 22 is illustrated by the progress of the objects shown in phantom lines in FIG. 4.

Preferably, each of the radially disposed discs 16 is comprised of a central hub 24 mounted on the shaft 14. It is also preferred that the means of mounting the hub to the shaft allow movement of the hub along the length of the shaft. As depicted in FIG. 3, the hole 26 through the hub 24 is of sufficient clearance about the shaft 14 that the hub, if unrestrained, could move in a direction parallel the longitudinal axis of the shaft. The radially disposed segments 22 of the discs 16 are affixed to the outer peripheral edge 28 of the hub 24.

One means of providing movement of the discs and the associated radially disposed segments is illustrated in FIG. 3 where resilient means, here shown as springs 34, are disposed to separate and space the adjacent discs 16 one from the other. The embodiment depicted has the advantage of providing adjustment spacing of the discs as well as providing some means for altering the force required to separate the discs.

By changing the spring constant of the elastic members interspersed between the discs, the force necessary to place and retain an object between the disc segments can be altered. In addition, by the adjustment of the nuts 25 on the shaft 14, the array of discs can be compressed to reduce the space (A) between the discs.

While the embodiment depicted in FIG. 3 provides for the movement of the discs relative to one another in order to accommodate objects therebetween other means of providing that movement may also be used. For example, the hubs or the discs could be rigidly affixed to the shaft 14 with the movement of the segments 22 being solely by elastic deformation of the material comprising the segments.

It is also preferred that some means for filling the space at the base of the radially disposed segments is provided and, as depicted in FIG. 3, a spacer 30 is affixed to the hub by means of the bolt 32. It is the function of the spacer to prevent movement of the objects grasped between the radially disposed segments from moving to the interior of the disc adjacent the shaft.

In accordance with the invention, there is also provided means between the discs for extracting the objects therefrom during the rotation of the discs.

As here embodied, and most clearly depicted in FIG. 4, the extracting means comprise an arcuate member 36 having one extremity 38 adjacent the spacer 30. The opposite extremity 40 of the arcuate member 36 is affixed outside the peripheral edge 18 of the discs 16. The arcuate member 36 preferably presents a convex surface to objects 42 between the segments 22, contacting the arcuate member 36 by rotation of the disc 16.

As here embodied, and most clearly depicted in FIGS. 3 an 4, the extremity 40 of the arcuate member 36 is affixed to the apparatus within a container 44. As depicted in FIG. 4, the objects between the discs are rotated within the grasp of the segments 22 and are extracted from between the discs by contact with the arcuate member 36 passing out from between the discs into the container 44. The configuration of the container is illustrative only and while the device may simply retain the objects 42 within a box-like container 44, the objects may be transported by other means (not shown) to a separate portion of the device or completely off the device to other receiving means.

As depicted herein, the apparatus includes a chassis 46 that supports the shaft 14 as well as providing means on which to attach various components of the apparatus.

Preferably, the arcuate member 36 is pivotally connected to a portion of the chassis allowing rotation of the member 36 in a plane perpendicular to the shaft 14. As depicted in FIG. 4, the arcuate member 36 is affixed to a bracket portion 48 of the chassis, within the container 44. Since the spacing of the discs one from the other is adjustable by compression of the springs 34, it is also preferred that the arcuate members be adjustable in a direction parallel to the shaft 14. As depicted in FIG. 5, the bracket 48 includes an elongated slot 50 into which the fastener 52 holding the extremity 40 of the arcuate member 36 is affixed. The slot allows the arcuate member 36 to be selectively attached to the bracket 48 in various positions relative to the length of the shaft 14.

The present invention is especially useful in the collection of nuts. In such an application the surface from which the nuts are collected includes other materials, such as sticks, weeds, etc., that would adhere to or lodge between the discs, thereby hindering the operation of the device. Therefore, it is preferred that the apparatus include means for cleaning the peripheral edge 18 of the segments 22. One means of cleaning the discs is depicted in FIGS. 3 and 4 which comprises a brush 54 mounted to the chassis of the device with the bristles of the brush contacting the peripheral edge of the segments 22 adjacent to the space therebetween.

It is also preferred that the apparatus include means for aligning the objects 42 with the smallest cross-sectional dimension of the object parallel to the shaft 14. With the spacing (A) between the discs in predetermined relation to the smallest cross-sectional diameter of the objects to be collected, pre-alignment of the objects improves the collection efficiency of the device. Furthermore, once the object is within the grasp of the discs, reorientation of the object cannot result in a lessening of the grasping force since the smallest dimension of the object is already engaged. As here embodied and depicted in FIG. 2, the apparatus may include a plurality of the guide members 56 for aligning the objects on the surface. The guide members are depicted herein as being affixed beneath the collecting means shown here as collector 44.

As here embodied, the outer peripheral edges 18 of the discs 16 are in contact with the surface 20. As the device 10 is propelled over the surface 20 as shown in FIG. 2, in a direction causing the counter-clockwise rotation of the discs 16, the objects initially contact the guide member 56 (if present) and the discs 16 pass over the objects 42 placing the objects within the spaces between the discs. As shown in FIG. 4, the objects grasped by the disc segments 22, upon further rotation of the discs, transport the objects to a location on the apparatus where they are deflected from between the discs by the arcuate member 36. The objects are then in a position to be retained in the collection means, depicted herein as container 44.

Referring now to the embodiment hereof illustrated in FIGS. 6-9, the collection apparatus of the present invention also comprises a plurality of axially spaced wheels, generally designated 60, for grasping objects from a surface. Wheels 60 are mounted on a shaft 62 rotatably carried by a frame 64. As best illustrated in FIG. 9, frame 64 has an upwardly extending handle 66 and a container 68 forwardly of wheels 60.

Referring now particularly to FIGS. 7 and 8, each wheel 60 includes a disc or circular plate 70 which is keyed to the shaft 62. A plurality of spacer sleeves 72 are disposed between discs 70 to axially space them one from the other along shaft 62. The spacers may be varied in axial length such that the spacing between discs 70 and hence wheels 60 can be varied as desired.

Each wheel further includes a plurality of elongated elastically deformable members 74 having their inner ends secured to the outer margins of the discs 70. Preferably, members 74 extend radially from discs 70 and are equally circumferentially spaced one from the other about the discs. From a review of FIGS. 7 and 8, it will be appreciated that each member 74 terminates at its distal end, i.e., its end remote from the axis of rotation about shaft 62, in an enlarged ball 76 for reasons discussed hereinafter. Each member 74 includes a flexible helical spring 78 secured at its inner end to a rod 80 which is slotted or grooved to receive the margin of a disc 70. The rod is preferably welded to disc 70 while the inner end of the flexible spring 78 is also welded to the rod 80. Other suitable connections between these elements could obviously be provided. A smaller diameter helical spring 82 is connected to the outer end of the inner helical spring 78 and forms an extension thereof. Thus, springs 78 and 82 lie coaxially one with the other and with the member 74. The outer end of the smaller helical spring 82 is suitably connected to the ball 76 for example by welding. With this arrangement of coaxial springs, it will be appreciated that the spring forces permit deflection of the outer helical spring 82 in response to a lesser force than necessary to deflect inner spring 78 to a like extent. Consequently, the members are more flexible adjacent the outer circumference of wheels 60, i.e., adjacent the balls 76, than adjacent discs 70. It will be appreciated that while the tips of the members 74 terminate in enlarged elements, preferably in the shape of balls or spheres, shapes other than balls, for example rectilinear blocks, semi-spherical elements, or the like may be utilized if desired. As explained hereinafter, the tips of members 74 should, however, be enlarged relative to the diameter or lateral extent of the members 74, particularly at radial locations adjacent the balls.

While not shown in the drawings of this embodiment, the extraction mechanism depicted in the embodiment hereof illustrated in FIGS. 1-5 including the arcuate members 36 may be pivotally secured to the frame 64 adjacent the container 68. Thus, the extremities of the arcuate members extend between wheels 60 while the base of each arcuate member extends beyond the outer periphery or beyond the radial extent of the balls 76 and adjacent container 68. Such arcuate members, as in the previous embodiment, guide the objects from between wheels 60 into the container 68 upon movement of the apparatus to the left and rotation of the wheels 60 in a counter-clockwise direction as illustrated in FIG. 9.

As hereinbefore specified, the area between adjacent balls 76, i.e., the area between axially opposed pairs of next adjacent balls, defines an opening of predetermined size or area smaller than the opening between the members 74 at a radial location closely adjacent such four balls. Thus, upon rotation of wheels 60 and location of an object between the balls, the balls flex away from one another to enlarge the opening therebetween. Once the object has been grasped, it is displaced upwardly into the space between the wheels and between the members 74. The larger area into which such objects are thrust enables the members 74 to elastically flex inwardly toward one another thus decreasing the opening between the balls. The objects are thus retained between the members inwardly of the balls and transported about the apparatus for extraction by the arcuate members into the collection container 68.

Referring now to FIGS. 10 and 11, there is illustrated a further form of wheel for use in picking up objects from a surface. In this form, the wheel is similar to the wheel of the embodiment illustrated in FIGS. 6–9 and includes central discs 70a, a shaft 62a to which the central discs 70a are keyed and a plurality of elongated elastically deformable members 60a preferably equally circumferentially spaced about discs 70a. Each member 74a includes a helical spring 78a suitably attached at its inner end to a slotted rod 80a by which the member 74a is secured to the corresponding discs 70a. The outer end of each helical spring 78a secured to a peg or rod 86. The outer tip of each rod 86 carries a ball 76a.

In this form, there is provided a plurality of arcuate forks 90 which extend between the axially spaced wheels 60a. Each fork 90 extends arcuately into such space and has a linearly extending portion which terminates in a tip 92 located substantially medially of the radial extent of the members 74a. The ends of forks 90 outwardly of the periphery of wheels 60a are secured to a bracket 94 which, in turn, is pivotally secured at 96 to the frame 64a. As in the prior embodiment, frame 64a carries collection container 68a. The rear wall of container 68a is bent rearwardly to form a flap 98 closely adjacent forks 90 whereby objects extracted from between the wheels 60a are guided along the forks for disposition within container 68a similarly as previously described.

While the embodiments of the invention shown herein are relatively simple, they provide an efficient means of collecting a large number of objects from the surface on which the objects are dispersed. The invention is applicable to the collection of objects of relatively large variations in cross-sectional dimension.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for collecting objects from a surface comprising:
   a frame;
   means for grasping the objects on the surface including a plurality of elongated elastically deformable members carried by said frame for rotation about an axis substantially parallel to the surface, said members being circumferentially and axially spaced one from the other about said axis, each of said members carrying an enlarged element at the end thereof remote from said axis of rotation, said members being elastically deformable in axial and circumferential directions relative to their axis of rotation to grasp the objects and locate such objects substantially radially inwardly of said enlarged elements, said elements precluding displacement of the objects in a radially outward direction upon further rotation of said members, said elastically deformable members having inner and outer portions, both of said portions being elastically deformable, said outer portion being capable of being deflected in response to a lesser force than necessary to deflect said inner portion to the same degree;
   means carried by said frame for extracting objects from between said members upon rotation of said members about said axis, and
   means carried by said frame for collecting the extracted objects.

2. Apparatus according to claim 1 wherein the opening defined between any four next adjacent elements about the periphery of said apparatus is smaller than the opening defined between the members carrying said four elements at a radial location closely adjacent said four elements whereby said members flex away from one another to enlarge the first mentioned opening upon grasping an object between said four elements and flex toward one another to reduce the first mentioned opening upon locating such objects radially inwardly of said four elements.

3. Apparatus according to claim 1 wherein said members extend substantially radially relative to said axis, a first helical spring forming said inner portion of said member, a second helical spring forming said outer portion of said member, and wherein said apparatus also includes means coupling said springs one to the other with said second spring being disposed radially outwardly of said first spring, said second spring having a spring force less than the spring force of the first spring, thereby enabling said second spring to flex in said axial and circumferential directions more readily than said first spring, said springs having their long axes substantially coaxial with the radial extent of said members.

4. Apparatus according to claim 1 wherein said members are disposed in axially spaced planes normal to said axis, said extracting means including elements projecting inwardly of said enlarged elements into the spaces between said planes to engage the objects grasped between said members and guide such objects outwardly of said members for collection by said collection means.

5. Apparatus according to claim 4 wherein said collection means includes a container, said projecting elements extending rigidly into said spaces for guiding the objects into said container.

6. Apparatus according to claim 5 wherein each of said projecting elements includes a fork extending into the space between adjacent planes, said forks being carried by said frame for pivotal movement about an axis generally parallel to the first mentioned axis between a first position with said forks extending into said spaces to engage the objects and guide them to said collection means and a second position with said forks removed from the spaces between said planes.

7. Apparatus according to claim 1 wherein said members extend substantially radially relative to said axis, a shaft carried by said frame for rotation about said axis, a plurality of axially spaced discs secured to said shaft for rotation with said shaft, and spacers spacing said discs axially along said shaft, the inner ends of said members being secured to said discs.

8. Apparatus according to claim 1 wherein said enlarged elements comprises balls carried at the distal end of said members.

9. Apparatus according to claim 1 wherein the opening defined between any four next adjacent elements about the periphery of said apparatus is smaller than the opening defined between the members carrying said four elements at a radial location closely adjacent said four elements whereby said members flex away from one another to enlarge the first mentioned opening upon grasping an object between said four elements and flex toward one another to reduce the first mentioned opening upon locating such objects radially inwardly of said four elements, said members being disposed in axially spaced planes normal to said axis, said extracting means including elements projecting inwardly of said enlarged elements into the spaces between said planes to engage the objects grasped between said members and guide such objects outwardly of said members for collection by said collection means.

10. Apparatus according to claim 9 wherein said projecting elements include forks extending rigidly into said spaces, said collection means including a container, said forks being arranged to guide the objects into said container.

11. Apparatus according to claim 1 wherein said members extend substantially radially relative to said axis, helical springs forming said inner and outer portions of said members, said springs having their long axes substantially coaxial with the radial extent of said members, the opening defined between any four next adjacent elements about the periphery of said apparatus being smaller than the opening defined between the members carrying said four elements at a radial location closely adjacent said four elements whereby said members flex away from one another to enlarge the first mentioned opening upon grasping an object between said four elements and flex toward one another to reduce the first mentioned opening upon locating such objects radially inwardly of said four elements, said members being disposed in axially spaced planes normal to said axis, said extracting means including elements projecting inwardly of said enlarged elements into the spaces between said planes to engage the objects grasped between said members and guide such objects outwardly of said members for collection by said collection means, said enlarged elements comprising balls carried at the distal end of said members.

12. Apparatus according to claim 11 wherein said members extend substantially radially relative to said axis, including a first helical spring forming at least part of each said member, a second helical spring forming at least a part of each said member, means coupling said springs one to the other with said second spring being disposed radially outwardly of said first spring, said second spring having a spring force less than the spring force of the first spring, thereby enabling said second spring to flex in said axial and circumferential directions more radily than the first spring, said springs having their long axes substantially coaxial with the radial extent of said members, said collection means including a container, said projecting elements extending rigidly into said spaces for guiding the objects into said container, each of said projecting elements including a fork extending into the space between adjacent planes, said forks being carried by said frame for pivotal movement about an axis generally parallel to the first mentioned axis between a first position with said forks extending into said spaces to engage the objects and guide them to said collection means and a second position with said forks removed from the spaces between said planes, said members extending substantially radially relative to said axis, a shaft carried by said frame for rotation about said axis, a plurality of axially spaced discs secured to said shaft for rotation with said shaft, and spacers spacing said discs axially along said shaft, the inner ends of said members being secured to said discs.

* * * * *